United States Patent
Smith et al.

(10) Patent No.: US 11,315,603 B2
(45) Date of Patent: *Apr. 26, 2022

(54) TEMPLATE-BASED EXCERPTING AND RENDERING OF MULTIMEDIA PERFORMANCE

(71) Applicant: Smule, Inc., San Francisco, CA (US)

(72) Inventors: Jeffrey Christopher Smith, Atherton, CA (US); Perry Raymond Cook, Jacksonville, OR (US); David Adam Steinwedel, San Francisco, CA (US); Ka Yee Chan, Milpitas, CA (US)

(73) Assignee: SMULE, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/939,679

(22) Filed: Jul. 27, 2020

(65) Prior Publication Data

US 2021/0174837 A1 Jun. 10, 2021

Related U.S. Application Data

(63) Continuation of application No. 16/509,688, filed on Jul. 12, 2019, now Pat. No. 10,726,874.

(51) Int. Cl.
| | |
|---|---|
| *H04N 9/80* | (2006.01) |
| *G11B 27/036* | (2006.01) |
| *H04N 9/87* | (2006.01) |
| *H04N 5/93* | (2006.01) |
| *H04N 21/2187* | (2011.01) |

(52) U.S. Cl.
CPC ......... *G11B 27/036* (2013.01); *H04N 9/8715* (2013.01); *H04N 21/2187* (2013.01)

(58) Field of Classification Search
CPC ...... G11B 27/036; H04N 9/87; H04N 9/8715; H04N 21/2187
USPC .................. 386/248, 232, 278, 284
See application file for complete search history.

(56) References Cited

U.S. PATENT DOCUMENTS

| | | | |
|---|---|---|---|
| 2006/0074810 A1 | 4/2006 | Verberkt et al. | |
| 2010/0211200 A1* | 8/2010 | Kobayashi | G06F 3/165 700/94 |
| 2012/0291059 A1 | 11/2012 | Roberts et al. | |

(Continued)

OTHER PUBLICATIONS

International Search Report and Written Opinion from International Application No. PCT/US2020/041589 dated Oct. 26, 2020, 10 pages.

*Primary Examiner* — Robert Chevalier
(74) *Attorney, Agent, or Firm* — Sterne, Kessler, Goldstein & Fox P.L.L.C.

(57) ABSTRACT

Disclosed herein are computer-implemented method, system, and computer-readable storage-medium embodiments for implementing template-based excerpting and rendering of multimedia performances technologies. An embodiment includes at least one computer processor configured to retrieve a first content instance and corresponding first metadata. The first content instance may include a first plurality of structural elements, with at least one structural element corresponding to at least part of the first metadata. The first content instance may be transformed by a rendering engine running on the at least one computer processor and/or transmitted to a content-playback device.

21 Claims, 6 Drawing Sheets

(56) References Cited

U.S. PATENT DOCUMENTS

2015/0052102 A1 2/2015 Nihal
2015/0365710 A1 12/2015 Bertrand et al.

* cited by examiner

TEMPLATE-BASED EXCERPTING AND RENDERING OF MULTIMEDIA PERFORMANCE

CROSS-REFERENCE TO RELATED APPLICATIONS

This application is a continuation of co-pending U.S. patent application Ser. No. 16/509,688, filed Jul. 12, 2019, issued as U.S. Pat. No. 10,726,874, the entirety of which is incorporated herein by reference.

BACKGROUND

The installed base of mobile phones and other portable computing devices grows in sheer number and computational power each day. Virtually ubiquitous and deeply entrenched in the lifestyles of people around the world, mobile devices transcend nearly every cultural and economic barrier. Computationally, modern mobile phones may offer speed and storage capabilities comparable to desktop computers of just a few years before, enabling on-demand sound synthesis and other musical applications. As a result, some modern mobile phones including smartphones, may support basic playback of audio and video.

However, mobile device platforms, networks, application execution environments, and sheer volume of content still impose significant practical limitations on application developers' abilities to deliver compelling user experiences with audiovisual entertainment to users of mobile devices. Playback customization options may be limited, such as to manual adjustments of playback settings for an entire content instance at a time. Other content instances may be alternated or interposed only between entire content instances, or at predetermined breakpoints that may disrupt natural flow of playback.

An instance of content for playback, such as a video or audio file of a song recording or a backing track for the song, may not have any way to differentiate structural elements of the song, such as music theoretic concepts of verse, chorus, bridge, hook, etc., and their structural boundaries within the song. Without awareness of such structural boundaries within content instances, playback options, such as for customization and interposition of other content, are limited and lack granularity.

SUMMARY

Disclosed herein are system, apparatus, device, method and/or computer-readable storage-medium embodiments, and/or combinations and sub-combinations thereof, for template-based excerpting and rendering of multimedia performances.

In some embodiments, at least one computer processor may be configured to retrieve a first content instance and corresponding first metadata. The first content instance may include a first plurality of structural elements, for example, with at least one structural element corresponding to at least part of the first metadata.

In some embodiments, the at least one computer processor may be further configured to select a first template comprising a first set of parameters. A parameter of the first set of parameters may be applicable to the at least one structural element, for example. The at least one processor may additionally associate the applicable parameter of the first template with the at least part of the first metadata corresponding to the at least one structural element.

In some embodiments, the at least one computer processor may be further configured to transform, by a rendering engine running on the at least one computer processor, the first content instance. The transforming may include configuring the at least one structural element of the first content instance to be played back according to the applicable parameter, for example. Additionally, or alternatively, the rendering engine may be run on at least one processor of a content-playback device.

In some embodiments, the at least one computer processor may be further configured to transmit the first content instance, as transformed, to a content-playback device. Additionally, or alternatively, the content instance may be played by at least one processor of a content-playback device.

Other embodiments, features, and advantages of the invention will be, or will become, apparent to one with skill in the art upon examination of the following drawings/figures and detailed description. it is intended that all such additional embodiments, features, and advantages be included within this description, be within the scope of this disclosure, and be protected by the claims that follow.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
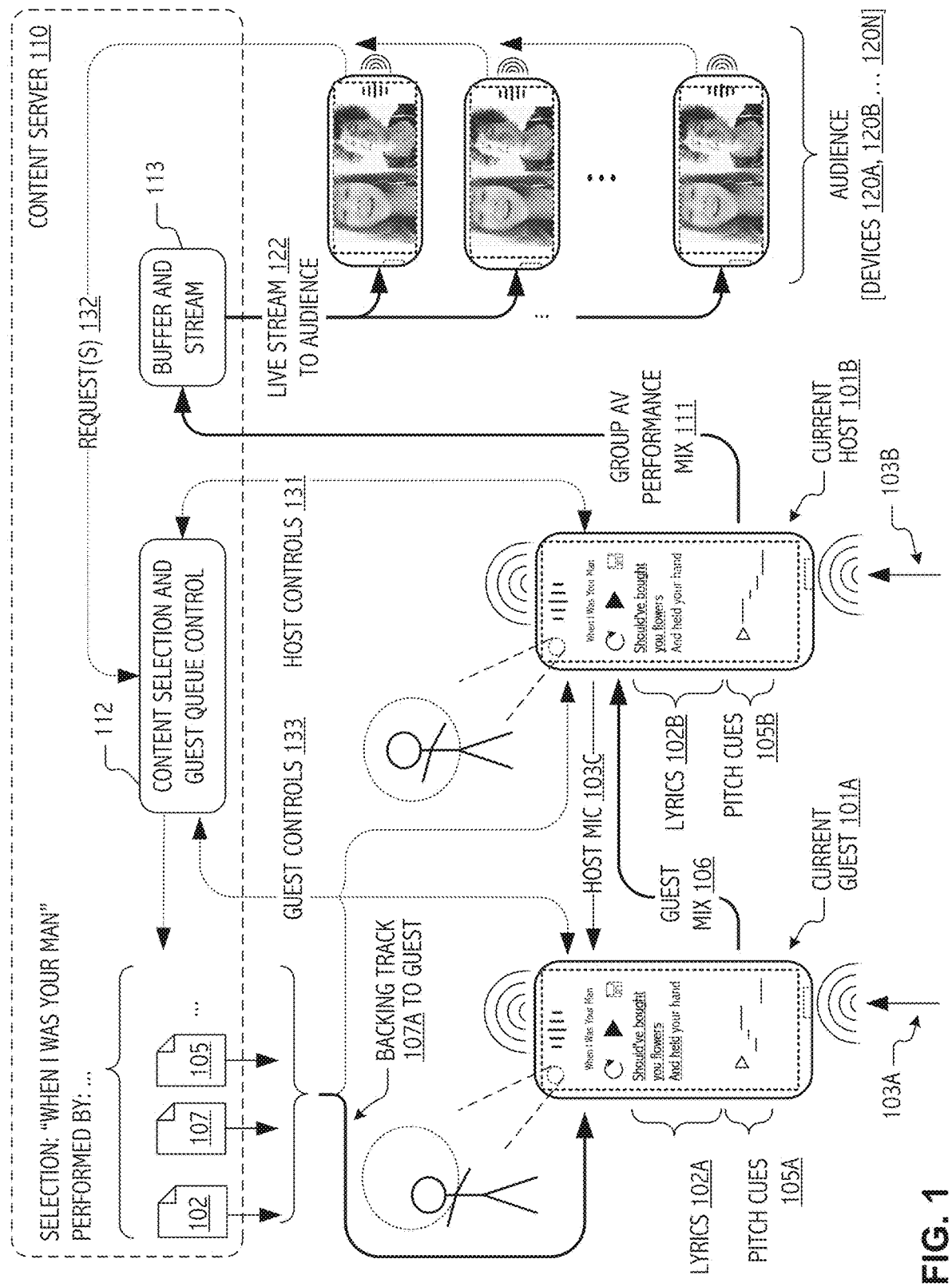
FIG. 1 is a diagram illustrating flows among illustrative computing devices as system components in a host-and-guest configuration, according to sonic embodiments.

Provided herein are system, apparatus, device, method and/or computer-readable storage-medium embodiments, and/or combinations and sub-combinations thereof, for template-based excerpting and rendering of multimedia performances technology.

Mobile phones may be configured to produce sound, and may also be configured to function as sound-capture devices. The advantages of ubiquity, strength in numbers, and handheld portability, make it feasible to bring together artists and fans for performances almost anywhere, anytime. The field of mobile music has been explored in several developing bodies of research that have shown that advanced digital acoustic techniques may be delivered in ways that provide compelling user experiences.

Despite practical limitations imposed by data volumes, mobile device platforms, networks, and application execution environments, by employing enhanced techniques as described herein, audiovisual performances, including vocal music, may be captured, processed, and/or coordinated with those of other users in ways that create meaningful musical performances not previously feasible outside of dedicated studios with specialized equipment.

In some cases, the vocal performances of individual users may be captured, and may include video synchronized with the performance, on mobile devices, in a context of karaoke-style presentation of lyrics in correspondence with audible renderings of a backing track. Captured audio may be processed with real-time pitch correction, helping users to overcome their shyness or uncertainty about the quality of their singing. Further examples of such processing are described in commonly owned U.S. Pat. Nos. 9,058,797 and 9,754,571, the entireties of which are incorporated by reference herein.

In some cases, contributions of multiple vocalists may be coordinated and mixed, creating performances of virtual "glee clubs" that include members from around the world. Further examples of such techniques are described in commonly owned U.S. Pat. Nos. 8,983,829 and 9,721,579, the entireties of which are incorporated by reference herein. In some cases, the performances of multiple vocalists may be combined in a manner that may enable selection of a prominent presentation of performance-synchronized audio and/or video of one or more of the contributors. The prominent presentation of particular performance synchronized audio and/or video, may he based on musical or score-related sectional song-structure boundaries. Additionally, or alternatively, prominent presentation may be based at least in part on time-varying parameters related to computationally-defined audio features extracted from (or computed over captured vocal audio. Further examples of such processing are described in commonly owned U.S. Pat. No. 9,911,403, the entirety of which is incorporated by reference herein.

In some cases, before, during, or after their audiovisual performances, users may select various audio and/or video filter effects, which may be applied, either on the device itself, or on a network-connected server. In some cases, these effects may be changed. throughout a song, particularly in alignment with structural boundaries within the song, which may correspond to music theoretic concepts such as verse, chorus, bridge, hook, or other structural elements.

In these cases, vocal audio may be modified by a variety of digital signal processing algorithms, including echo, reverberation, dynamic range compression, or pitch-correction in accord with a particular key or scale for the vocal performance, to name a few non-limiting examples. Harmony notes or chords may also be added as part of the application of audio filters, in some embodiments. Vocal audio from multiple performers may be mixed, composited, enhanced, and/or highlighted by audio effects such as panning, shifting, flanging, and other filters, for example.

Also in these cases, captured video may be modified by a variety of video effects or filters, including blur or sharpening, color map modification, background augmentation or replacement, animations, facial attachments or overlays (bunny ears, sunglasses, hats, fake hair, etc.), facial augmentation (nose or eye enlargement, etc.), text display (such as lyrics, translations, comments, etc.), transitions between scenes, which may be timed to content segments or transitions between content segments, for example, For audiovisual performances which have been captured from multiple singers, the video components from these different performers may be combined using wipes, fades, dissolves, multi-frame filings, and other video effects.

These virtual audiovisual performances may be combined with time-varying audio and/or video effects, filters, transitions, etc., based at least in part on the enhanced techniques described herein. Additionally, this enhanced content may be shared by users on social media platforms, promotional channels, via email and text, and/or similar means of sharing media and related content. Mechanics for inviting other singers to join in the virtual performances may also be provided in such systems.

Such audiovisual performances may be compelling and engaging for users, especially when enhanced by time-varying audio and/or video filters, effects, and transitions. Applying these filters, effects, and transitions, for example, based on sections and components related to musical structure, may make the final product even more effective. Also, the filters, effects, and transitions may be arranged to evoke certain moods or emotions, such as "happy," "sad," "rainy-day," "romance," "birthday celebration," etc. To enable automated processes to apply such effects to sections or components of content instances based on structural boundaries, computer processor(s) may utilize a specialized template.

Templates may include collections or sets of stylistic choices that may be applicable to audiovisual content. Stylistic choices may include audiovisual filters. Examples of audio filters include: pitch shift, harmonies, echo and/or reverb, equalization, dynamic range compression/expansion, amplitude or frequency modulation, etc.

Examples of video filters include: blur or sharpening, color map modification, background augmentation or replacement, animations, facial attachments or overlays (bunny ears, sunglasses, hats, fake hair, etc.), facial augmentation (nose or eye enlargement, etc.), text display (such as lyrics, translations, comments, etc.), transitions between scenes (which may be timed to content segments or transitions between content segments, for example). Stylistic choices contained within a template may be mapped to a structural element of a content instance, such as musical composition.

In this way, a template may be applied to any audiovisual content where the structure of the underlying musical composition is known. A template may also include information about which stylistic and/or structural elements to include, exclude, or alter, within a given audiovisual content instance, allowing the content to be re-ordered or edited based on the template and/or any instructions in or accompanying the template, Applying a template may allow end-users to immediately give a different "look and feel" to content that they create or consume.

Templates may allow a platform to increase the variety of content available on the platform by creating multiple, different pieces of audiovisual content from the same source material by applying different templates. Templates may allow a platform to reformat and reassemble audiovisual content for third-party platforms (e.g., Facebook, Twitter, Snapchat, Instagram Stories, etc.) automatically, in a way that is musically correct, subjectively pleasing, and user-friendly.

At a high level, e.g., end-users may create recordings incorporating Smule content, create and/or apply templates to consume, publish, or track recordings or promotions that are published on a given platform. Certain artificial intelligence (AI) or machine learning (ML) implementations may be trained (from a manually created training set) and may improve over time, through supervised/unsupervised learning, with direct/indirect feedback and metrics from users, ML may also be configured to filter or adjust promotional presentations to avoid fatigue for viewers.

FIG. 1 depicts information flows (data flows) and control flows (process flows) among illustrative mobile phone-type portable computing devices as system components in a host-and-guest configuration for live-streaming an audiovisual performance by multiple performers, according to some embodiments. These components may further include at least one processor and memory such as those of FIG. 6. As a practical implementation, any action orchestrated between any components shown in FIG. 1 may, in some embodiments, be treated as an example of any corresponding step in methods 400 or 500 implementing enhanced techniques described herein for template-based excerpting and rendering of multimedia performances, for example.

Audiovisual performances including vocal music may be captured and coordinated with performances of other users in ways that may create compelling user and listener experiences. For example, in some cases or embodiments, duets or other group performances with a host performer may be supported in a sing-with-the-artist style audiovisual livestream in which aspiring vocalists request or queue particular songs for a live radio show entertainment format. The enhanced techniques may provide synchronous vocal performances captured at geographically-separated devices (e.g., at globally-distributed, but network-connected, mobile phones or tablets, or at audiovisual capture devices geographically separated from a live studio).

Audio-only embodiments may be implemented, in some embodiments.

Additionally, livestream content may include performance-synchronized video captured in connection with vocals, In addition, while network-connected mobile phones are illustrated as audiovisual capture devices, it will be appreciated based on the description herein that audiovisual capture and viewing devices may include suitably-configured computers, smart TVs, living room style set-top box configurations, and/or virtual assistant devices with audio and/or audiovisual capture devices or capabilities. While applications to vocal music are described in detail, it will be appreciated based on the description herein that audio or audiovisual capture applications need not be limited to vocal solos or duets, but may be adapted to other forms of group performance in which one or more successive performances may be accreted to a prior performance to produce a livestream.

In some cases, the vocal performances of collaborating contributors may be captured (together with performance synchronized video) in the context of a karaoke-style presentation of lyrics and in correspondence with audible renderings of a backing track. In some cases, vocals and/or synchronized video may be captured as part of a live or unscripted performance with vocal interactions (e.g., a duet or dialog) between collaborating contributors. In each case, it is envisioned that non-negligible network communication latencies will exist between at least some of the collaborating contributors, particularly where those contributors may be geographically separated. As a result, a technical challenge exists to manage latencies and the captured audiovisual content in such a way that a combined audio visual performance nonetheless may be disseminated (e.g., broadcast) in a manner that may present to recipients, listeners and/or viewers as a live interactive collaboration.

Although much of the description herein presumes, for purposes of illustration, a fixed host performer on a particular host device, it will be appreciated based on the description herein that some embodiments in accordance with the present disclosure may provide host/guest control logic that allows a host to "pass the mic" such that a new user (in some cases a user selected by the current host and other cases, a user who "picks up the mic" after the current host "drops the mic") may take over as host. Likewise, it will be appreciated based on the description herein that some embodiments in accordance with the present disclosure may provide host/guest control logic that queues guests (and/or aspiring hosts) and automatically assigns queued users to appropriate roles.

In some cases or embodiments, vocal audio of individual host- and guest-role performers may be captured together with performance synchronized video in a karaoke-style user interface framework and coordinated with audiovisual contributions of the other users to form duet-style or glee club-style group audiovisual performances. For example, the vocal performances of individual users may be captured (together with performance synchronized video) on mobile devices, television-type display and/or set-top box equipment in the context of karaoke-style presentations of lyrics in correspondence with audible renderings of a backing track. In some cases or embodiments, score-coded continuous pitch correction may be provided as well as user selectable audio and/or video effects. Consistent with the foregoing, but without limitation as to any particular embodiment claimed, karaoke-style vocal performance capture using portable handheld devices provides illustrative context.

Pitch-corrected, karaoke-style, vocal capture using mobile phone-type and/or television-type audiovisual equipment may provide useful descriptive context in the form of non-limiting examples. In some embodiments such as illustrated in FIG. 1, handhelds 101A, 101B operating as guest and host devices, respectively, execute software that operates in coordination with a content server 110 to provide vocal capture. The configuration optionally provides continuous real-time, score-coded pitch correction and harmonization of the captured vocals. Performance synchronized video may also be captured using a camera provided by, or in connection with, a computer, a television or other audiovisual equipment (not shown) or connected set-top box equipment. In some embodiments, performance synchronized video may be captured using an on-board camera provided by handheld paired with connected set-top box equipment. Suitable techniques are detailed in commonly owned, co-pending U.S. patent application Ser. No. 15/337,866, filed Oct. 28, 2016, the entirety of which is incorporated by reference herein.

In the illustration of FIG. 1, a current host user of current host device 101B at least partially controls the content of a livestream 122 that may be buffered for, and streamed to, an audience on devices 120A, 120B . . . 120N. In the illustrated configuration, a current guest user of current guest device 101A may contribute to the group audiovisual performance mix 111 that may be supplied (eventually via content server 110) by current host device 101B as livestream 122. Although devices 120A, 120B . . . 120N and, indeed, current guest and host devices 101A, 101B are, for simplicity, illustrated as handheld devices such as mobile phones, persons of skill in the art having benefit of the present disclosure will appreciate that any given member of the audience may receive livestream 122 on any suitable computer, smart television, tablet, via a set-top box or other streaming media capable client.

Content that may be mixed to form group audiovisual performance mix 111 may be captured, in the illustrated configuration, in the context of karaoke-style performance capture wherein lyrics 102, optional pitch cues 105 and a backing track 107 may be supplied from content server 110 to either or both of current guest device 101A and current host device 101B. Roll of lyrics 102A and optional pitch cues 105A at current guest device 101A may be in temporal correspondence with the backing track 107A, and may be likewise subject to start/stop/pause control by the current guest. In some cases or situations, backing audio and/or video may be rendered from a media store resident on or accessible from a handheld, set-top box, etc.

Respective telecommunications carrier wireless facilities and/or wireless local area networks and respective wide-area network gateways (not shown) may provide communications to and from devices 101A, 1013, 120A, 120B . . . 120N, Based on the description herein, persons of skill in the art will recognize that any of a variety of data communications facilities, including 802.11 Wi-Fi, Bluetooth, 4G-LTE wireless, wired data networks, wired or wireless audiovisual interconnects such as in accordance with HDMI, AVI, Wi-Di, or equivalent standards or facilities may employed, individually or in combination to facilitate communications and/or audiovisual rendering described herein.

User vocals 103A and 103B may be captured at respective handhelds 101A, 101B, and may be optionally pitch-corrected continuously and in real-time and audibly rendered mixed with the locally-appropriate backing track (e.g., backing track 107A at current guest device 101A and guest mix 106 at current host device 101B) to provide the user with an improved tonal quality rendition of his/her own vocal performance. Pitch correction may be based on score-coded note sets or cues (e.g., the pitch and harmony cues 105A, 105B visually displayed at current guest device 101A and at current host device 101B, respectively), which provide continuous pitch-correction algorithms executing on the respective device with performance-synchronized sequences of target notes in a current key or scale, in addition to performance-synchronized melody targets, score-coded harmony note sequences (or sets) provide pitch-shilling algorithms with additional targets (e.g., coded as offsets relative to a lead melody note track and/or scored for selected portions thereof) for pitch-shifting to harmony versions of the user's own captured vocals. In some cases, pitch correction settings may be characteristic of a particular artist such as the artist that performed vocals associated with the particular backing track.

In general, lyrics, melody and harmony track note sets and related timing and control information may be encapsulated in an appropriate container or object (e.g., in a Musical Instrument Digital Interface (MIDI) or JavaScript Object Notation (NON) format) for supply together with the backing track(s). Using such information, devices 101A and 101B (as well as associated audiovisual displays and/or set-top box equipment, not shown) may display lyrics and/or visual cues related to target notes, harmonies and currently detected vocal pitch in correspondence with an audible performance of the backing track(s) so as to facilitate a karaoke-style vocal performance by a user. Thus, if an aspiring vocalist selects "When I Was Your Man," files your_man.json and your_man.m4a may be downloaded from the content server (if not already available or cached from a prior download) and, in turn, may be used to provide background music, synchronized lyrics and, in some situations or embodiments, score-coded note tracks for continuous, real-time pitch-correction while the user sings.

Optionally, at least for certain embodiments or genres, harmony note tracks may be score coded for harmony shifts to captured vocals. A captured pitch-corrected (possibly harmonized) vocal performance together with performance synchronized video may be saved locally, on the handheld device or set-top box, as one or more audiovisual files and may be subsequently compressed and encoded for communication (e.g., as guest mix 106 or group audiovisual performance mix 111 or constituent encodings thereof) to content server 110 as an MPEG-4 container file. MPEG-4 may be one suitable standard for the coded representation and transmission of digital multimedia content for the Internet, mobile networks and advanced broadcast applications. Other suitable codecs, compression techniques, coding formats and/or containers may be employed if desired.

As will be appreciated by persons of skill in the art having benefit of the present disclosure, performances of multiple vocalists (including performance synchronized video) may be accreted and combined, such as to form a duet-style performance, glee club, or vocal jam session. In some embodiments, social network constructs may at least partially supplant or inform host control of the pairings of geographically-distributed vocalists and/or formation of geographically-distributed virtual glee clubs. For example, relative to FIG. 1, individual vocalists may perform as current host and guest users in a manner captured (with vocal audio and performance synchronized video) and eventually streamed as a livestream 122 to an audience. Such captured audiovisual content may, in turn, be distributed to social media contacts of the vocalist, members of the audience etc., via an open call mediated by the content server. In this way, the vocalists themselves, members of the audience (and/or the content server or service platform on their behalf) may invite others to join in a coordinated audiovisual performance, or as members of an audience or guest queue.

Where supply and use of backing tracks is illustrated and described herein, it will be understood, that vocals captured, pitch-corrected (and possibly, though not necessarily, harmonized) may themselves be mixed (as with guest mix 106) to produce a "backing track" used to motivate, guide or frame subsequent vocal capture. Furthermore, additional vocalists may be invited to sing a particular part (e.g., tenor, part B in duet, etc. or simply to sing, the subsequent vocal capture device (e.g., current host device 101B in the configuration of FIG. 1) may pitch shift and place their captured vocals into one or more positions within a duet or virtual glee club. These and other aspects of performance accretion are described (including for a content server mediated embodiment) in commonly owned U.S. Pat. No. 8,983,829, the entirety of which is incorporated by reference herein.

Figure 2:
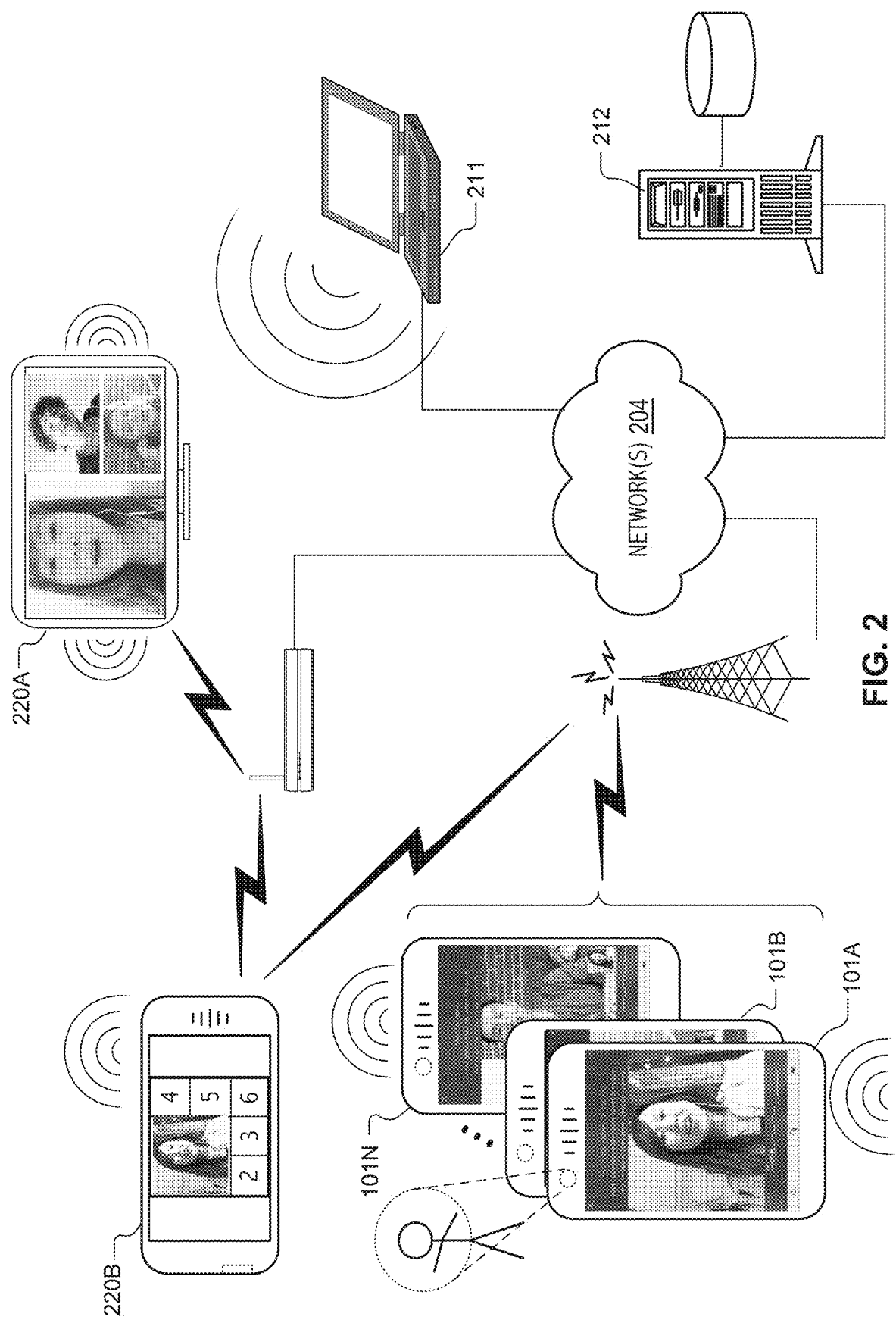
FIG. 2 is a diagram illustrating an example interaction among some system components on a network, according to some embodiments.

FIG. 2 is a network diagram that illustrates interaction of exemplary system components, according to some embodiments. These components may further include at least one processor and memory such as those of FIG. 6. As a practical implementation, any action orchestrated between any components shown in FIG. 2 may, in some embodiments, be treated as an example of any corresponding step in methods 400 or 500 implementing enhanced techniques described herein for template-based excerpting and rendering of multimedia performances, for example.

In particular, FIG. 2 illustrates respective instances of handheld devices or portable computing devices such as mobile device(s) employed in audiovisual capture 101 (encompassing any or all of 101A, 1O1B, . . . 101N), which may be programmed with vocal audio and video capture code, user interface code, pitch correction code, an audio rendering pipeline, and/or playback code, for example, according to the functional descriptions herein.

A first device instance is depicted as, for example, employed in a vocal audio and performance synchronized video capture 101 of a seed performance is depicted operating, while device instance 220B may operate in a presentation or playback mode for a mixed audiovisual performance with dynamic visual prominence for performance synchronized video. An additional television-type display and/or set-top box equipment 220A is likewise depicted operating in a presentation or playback mode. Such equipment may also operate as part of a vocal audio and performance synchronized video capture facility.

Each of the aforementioned devices may communicate via wireless data transport and/or intervening networks 204 with a server 212 or service platform that may host storage and/or functionality explained herein with regard to content server 110, Captured, pitch-corrected vocal performances with performance synchronized video mixed to present mixed AV performance rendering based on a visual progression of template screen layouts as described herein may be streamed and audiovisually rendered on a display of an end-user computing device 211.

Figure 3:
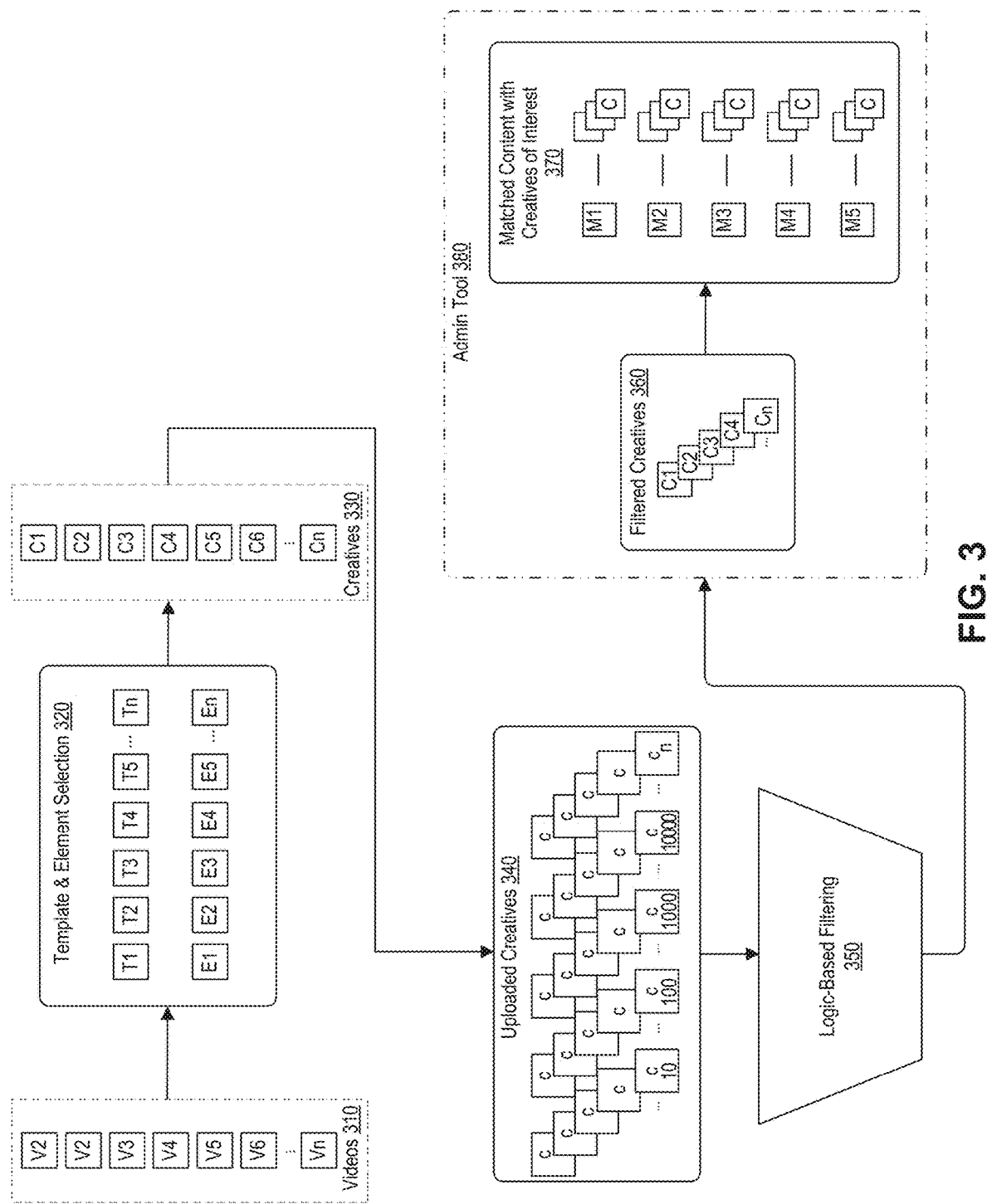
FIG. 3 is a diagram illustrating an example architecture including some system components, according to some embodiments.

FIG. 3 is a diagram illustrating an example system 300 including an example architecture of some system components, according to some embodiments. These components may further include at least one processor and memory such as those of FIG. 6. As a practical implementation, any action orchestrated between any components shown in FIG. 3 may, in some embodiments, be treated as an example of any corresponding step in methods 400 or 500 implementing enhanced techniques described herein for template-based excerpting and rendering of multimedia performances, for example.

Videos 310 may include a collection of backing tracks, for example, as described in further detail elsewhere in this disclosure, In some embodiments, videos 310 may include pre-recorded or near-real-time live content generated by users, e.g ., solo or multiple recordings of various users, synchronously or asynchronously.

Templates and elements selection 320 may include selection of any number of templates and/or elements that may be applied to a certain instances of videos 310. As described in further detail elsewhere in this disclosure, elements may include segments of content, such as specific clip(s) of particular instance(s) of videos 310, defined by metadata, template(s), machine-learning (or other) classification, for example, Templates and/or elements as shown in templates and elements selection 320 may be created and hosted by an owner of a platform or system 300. Additionally, or alternatively, such templates and/or elements may be created, edited, uploaded, downloaded, modified, hosted, or otherwise utilized by third parties, including end-users of the platform or system 300. To create and/or edit templates, third parties, including end-users, may use any number of compatible editing tools, which may include web interfaces or commonly-owned applications of system 300, and/or third-party applications (for mobile or other types of computing devices), to name a few non-limiting examples.

Templates, as described in further detail elsewhere in this disclosure, may be applied to any of multiple content instances independently of the structure or any specific structural elements of a given content instance. Application of a template may, for example, cause at least one processor 604 to change a style of a given content instance and/or splice other content from another instance into the given content instance. Changes of style and/or content may thus, based at least in part on the template, be context-aware for a given content instance, independent of the structure of the given content instance.

Creatives 330 may include recorded content from end-users (e.g., a user recording a video of the user singing a song, via a camera and microphone in a handheld device), with application of a given template for a selected element. In some embodiments, the end-user recorded content may be pre-recorded, as part of videos 310. Alternatively, the end-user recorded content may be introduced or integrated with a content instance (e.g.. an instance of videos 310) after a template has been applied for a selected element.

In some embodiments, the end-user recorded content may be selectively integrated and/or customized together with an instance of videos 310, based on a template from templates and elements selection 320. Accordingly, creative 330 may be defined, for some embodiments, as a combination of a content instance (e.g., of videos 310), an applicable template, and at least one instance of a recording from at least one end-user.

Uploaded creatives 340 may include at least one collection of creatives 330 uploaded to at least one data store, which may be accessible collectively by at least one computer system 600 and/or included processor(s) 604. By having a sufficiently large set of uploaded creatives 340, additional information may be harvested or identified from the collection(s) of uploaded creatives 340. Such harvesting or identification may be performed, in whole or in part, via logic-based filtering 350.

Logic-based filtering 350 may include may include at least one machine-learning signal, such as key performance indicator (KPI)-style input to logic function(s) which may include at least one machine-learning algorithm, in sonic embodiments. Examples of ML and related algorithms may include neural networks that may be configured to implement aspects of a classification algorithm, regression algorithm, or other algorithms that may detect or recognize certain patterns, for example. In some embodiments, ML may also be configured to filter or adjust promotional presentations, for example, to avoid fatigue for viewers. KPI-style inputs as ML signals may include user-engagement metrics (e.g., clicks, likes, etc.), views/listens (e.g., for a specific performance), seeds/joins (e.g., for performances having multiple performers), or similar raw data or analytics, in some embodiments.

Any ML techniques employed herein may involve supervised learning, unsupervised learning, a combination thereof (semi-supervised learning), regressions (e.g., for intermediate scoring, even if resultant output is a classification), reinforcement learning, active learning, and other related aspects within the scope of ML. Deep learning may apply any of the ML techniques described herein to a perceptron, a multi-layer perceptron (MLP) model, a hierarchical neural network, a recurrent neural network, a sequential encoder, a recursive neural network, a modular neural network, a feedforward neural network, or a memory network, to name a few non-limiting examples. Some cases of a feedforward neural network may, for example, further correspond to at least one of a convolutional neural network (CNN), a probabilistic neural network, a time-delay neural network, an autoencoder, or any combination thereof, in some embodiments.

Classification algorithm(s) may be configured to determine one or more musical genres, subjective moods (e.g., based on crowd-sourced or expert indications), or objective metrics (e.g., pitch, volume, dynamic range, color, brightness, etc.) of a content instance or structural element/segment thereof, for example. In some embodiments, regression algorithm(s) may be used to determine similarity or compatibility across one or more content instance(s) or structural element(s)/segment(s) thereof, such as for determining an appropriate content instance to splice or for appropriate timing to insert, substitute, or overlay a given content instance with another content instance, for example.

Filtered creatives 360 may include output of the logic-based filtering 350 described above. Filtered creatives 360 may further include results of a classification algorithm, as described above. Additionally, or alternatively, filtered creatives may include results of a regression algorithm, optionally compared against a predetermined threshold, for example. In some embodiments, filtered creatives 360 may be identified as creatives of interest (e.g., by logic-based filtering 350 or manually via an optional admin tool 380) and matched with content comparison (also, e.g., by logic-based filtering 350 or manually via an optional admin tool 380), yielding matched content with creatives of interest 370.

Matched content with creatives of interest 370 may include elements and/or content instances to be spliced, merged, substituted, overlaid, or otherwise combined sequentially or simultaneously. Additionally, matched content with creatives of interest 370, or any corresponding element or content instance thereof, may be designated for sharing within a given system 300 platform, or externally, such as with third-party platforms. Such designation may be made automatically, e.g., by logic-based filtering 350, or manually via optional admin tool 380, in some embodiments.

Admin tool 380 may include interface element(s) allowing end-users, platform administrators, and/or automated (e.g., AWL) components to access filtered creatives 360 and content thereof, match content with creatives of interest 370, and/or share matched content with creatives of interest 370 (or other content/recordings) internally (e.g., with other users on system 300) or externally (not shown), for example. In some embodiments, admin tool 380 may comprise a web-based graphical user interface (GUI) and/or at least one application programming interface (API), to allow users and/or other programs to interact with admin tool 380 for at least the purposes described herein.

Figure 4:
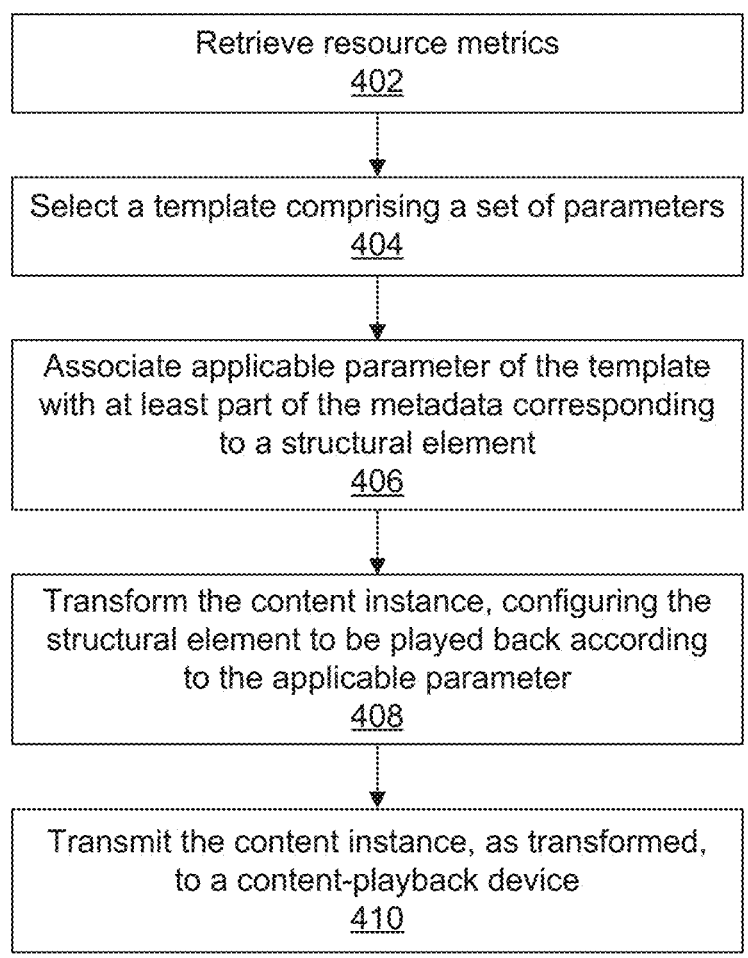
FIG. 4 is a flowchart illustrating a process implementing some of the enhanced techniques described herein, according to some embodiments.

FIG. 4 is a flowchart illustrating a method 400 for operation of the enhanced database platform integration techniques described herein, according to some embodiments. Method 400 may be performed by processing logic that may comprise hardware (e.g., circuitry, dedicated logic, programmable logic, microcode, etc.), software (e.g., instructions executing on a processing device), or a combination thereof. Not all steps of method 400 may be needed in all cases to perform the enhanced techniques disclosed herein. Further, some steps of method 400 may be performed simultaneously, or in a different order from that shown in FIG. 4, as will be understood by a person of ordinary skill in the art.

Method 400 shall be described with reference to FIGS. 1-4 and 6. However, method 400 is not limited only to those example embodiments. The steps of method 400 may be performed by at least one computer processor coupled to at least one memory device. An exemplary processor and memory device(s) are described below with respect to FIG. 6. In some embodiments, method 400 may be performed by components of systems shown in FIGS, 1-3, which may further include at least one processor and memory such as those of FIG. 6.

In 402, at least one processor 604 may be configured to retrieve a first content instance and corresponding first metadata. The first content instance may include multiple structural elements, in some embodiments. Further, at least one structural element may correspond to at least part of the first metadata. Examples of metadata may include, but are not limited to, content length (playback time), segment break(s), indications of recording types associated with particular segments (e.g., where at least one user may record a vocal solo, duet, chorus, etc., within a given segment).

In some embodiments, metadata may be represented by tags, such as may be represented by fields in a markup language, such as the Standard Generalized Markup Language (SGML; ISO 8879:1986). Other examples of markup languages are described further below, and may be used additionally or alternatively to existing tagging solutions. Other tagging means may include database structures, including structured or unstructured data stores, in plain text or binary data formats, including key-value pair data stores, hash tables, relational databases, or any combination thereof. Further examples of some databases are described further below.

In 404, processor 604 may be configured to select a first template comprising a first set of parameters. A parameter of the first set of parameters may be applicable to the at least one structural element. For example, a parameter may, in some embodiments, be a representation of an audio filter (e.g., band-pass, revert, etc.), video filter (e.g., grayscale, color profile, lighting profile, blurring, trailing, special effects, etc.), text filter (e.g., lyrics, translations, commentary, real-time chat feed, etc.), or the like. In some embodiments, parameters may be applied during rendering and/or during playback, for example.

A template may be a collection of parameters and tags that may be associated with metadata of any given content instance of multiple content instances, independent of any particular structural element of a given content instance. More detail of this association is described with respect to 406 below.

A structural element, in some embodiments, may represent a segment of a given content instance. For example, of a three-minute content instance, a segment may be a designated fifteen-second clip, which may be characterized by certain metadata that may be different from metadata characterizing the rest (other segments) of the three-minute content instance. Any other lengths of the content instance or the segment may be used within the scope of this disclosure.

In some embodiments, further examples of structural elements may include certain metadata that may be treated as immutable for a given content instance (e.g., unique identifier, origin code, etc.), which may be used to reference a given content instance or segment thereof from a given data store or other programmatic means, e.g., via an application programming interface (API). Specific examples of APIs are described further below.

In some embodiments, parameter may include a tuple, vector, matrix, or at least one further parameter indicating a degree to which a first parameter is applied (e.g., numeric scale of luminous intensity, blurring, residual trailing, RGB values, audio frequencies, etc.). In some embodiments, parameter may include an indication of whether or not a given feature or filter is active (e.g., on or off).

In 406, processor 604 may be configured to associate the applicable parameter of the first template with the at least part of the first metadata corresponding to the at least one structural element. Such association may be done by any of the data structures described herein (e.g., key-value pair, table, relational database, etc., or other object in a computer memory or data storage device), in some embodiments. This association between metadata and parameters may thus serve to allow processor 604 to apply templates (e.g., templates' parameters) to any of multiple content instances independently of the structure or any specific structural elements of a given content instance.

In 408, processor 604 may be configured to transform, by a rendering engine running on processor 604, the first content instance. This transforming may include processor 604 configuring the at least one structural element of the first content instance to be played back according to the applicable parameter (e.g., of an applied template).

Rendering engine may run on processor 604 at a server of a service provider or content-distribution network (CDN), in sonic embodiments. Additionally, or alternatively, rendering engine may run on processor 604 at a client or end-user device (e.g., consumer handheld terminal device such as smartphone, tablet, or phablet; wearable device such as a smart watch or smart visor; laptop or desktop computer; set-top box or similar streaming device; etc.). Client-side transforming, e.g., content playback and/or rendering with applied templates or parameters, is described in further detail with respect to 608 below.

Server-side or client-side transforming may include statically or dynamically encoding, recoding, transcoding, and/or decoding audio, video, and/or text content via any of multiple audio/video codecs. The audio, video, and/or text content may be encoded, recoiled, transcoded, or decoded before, during, or after any transforming in 408. In some embodiments, any of the encoding, recoding, transcoding, and/or decoding may be performed within the rendering engine running on processor 604.

In 410, processor 604 may be configured to transmit the first content instance, as transformed, to a content-playback device. A content-playback device may be a handheld terminal, wearable device, general-purpose computing device, or dedicated set-top box or streaming device, in some embodiments. Additional examples are described further herein.

Figure 5:
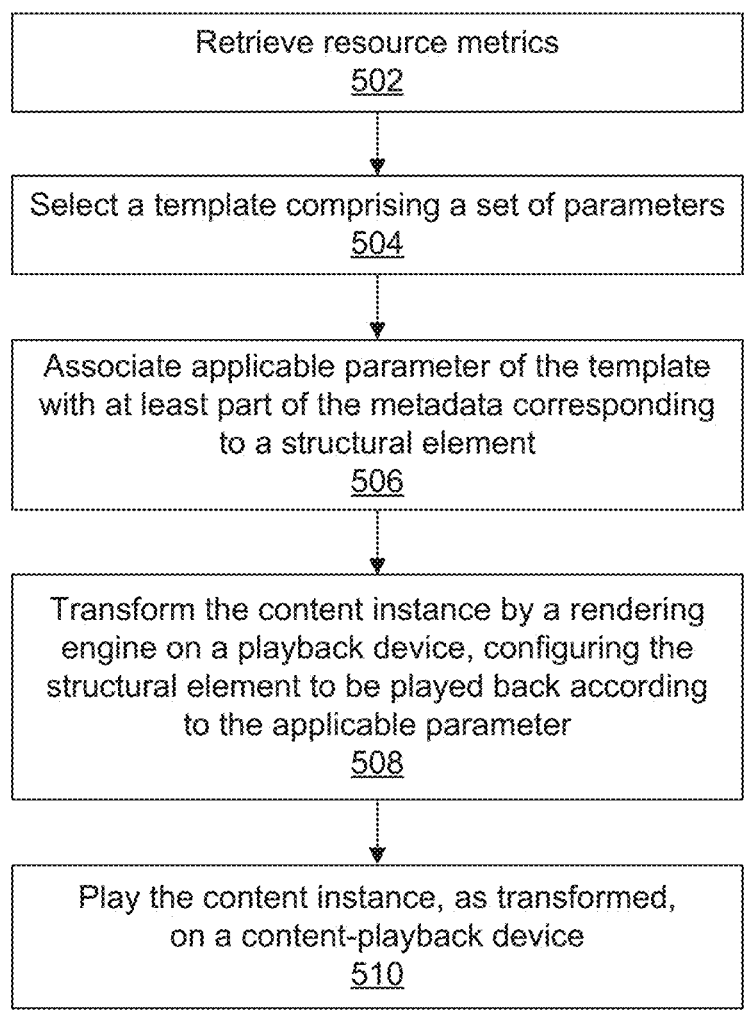
FIG. 5 is a flowchart illustrating a process implementing sonic of the enhanced techniques described herein, according to some embodiments.

FIG. 5 is a flowchart illustrating a method 500 for operation of the enhanced database platform integration techniques described herein, according to some embodiments. Method 500 may be performed by processing logic that may comprise hardware (e.g., circuitry, dedicated logic, programmable logic, microcode, etc.), software (e.g., instructions executing on a processing device), or a combination thereof. Not all steps of method 500 may be needed in all cases to perform the enhanced techniques disclosed herein. Further, some steps of method 500 may be performed simultaneously, or in a different order from that shown in FIG, 5, as will be understood by a person of ordinary skill in the art.

Method 500 shall be described with reference to FIGS. 1-3, 5, and 6. However, method 500 is not limited only to those example embodiments. The steps of method 500 may be performed by at least one computer processor coupled to at least one memory device. An exemplary processor and memory device(s) are described below with respect to FIG. 6. In some embodiments, method 500 may be performed by components of systems shown in FIGS. 1-3, which may further include at least one processor and memory such as those of FIG. 6.

In 502, at least one processor 604 may be configured to retrieve a first content instance and corresponding first metadata. The first content instance may include multiple structural elements, in some embodiments. Further, at least one structural element may correspond to at least part of the first metadata. Examples of metadata may include, but are not limited to, content length (playback tune), segment break(s), indications of recording types associated with particular segments (e.g., where at least one user may record a vocal solo, duet, chorus, etc., within a given segment).

In some embodiments, metadata may be represented by tags, such as may be represented by fields in a markup language, such as the Standard Generalized Markup Language (SGML; ISO 8879:1986). Other examples of markup languages are described further below, and may be used additionally or alternatively to existing tagging solutions. Other tagging means may include database structures, including structured or unstructured data stores, in plain text or binary data formats, including key-value pair data stores, hash tables, relational databases, or any combination thereof. Further examples of some databases are described further below.

In 504, processor 604 may be configured to select a first template comprising a first set of parameters. A parameter of the first set of parameters may applicable to the at least one structural element. For example, a parameter may, in some embodiments, be a representation of an audio filter (e.g., band-pass, reverb, etc.), video filter (e.g., grayscale, color profile, lighting profile, blurring, trailing, special effects, etc.), text filter (e.g., lyrics, translations, commentary, real-time chat feed, etc.).

A template may be a collection of parameters and tags that may be associated with metadata of any given content instance of multiple content instances, independent of any particular structural element of a given content instance. More detail of this association is described with respect to 506 below.

A structural element, in some embodiments, may represent a segment of a given content instance. For example, of a three-minute content instance, a segment may be a designated fifteen-second clip, which may be characterized by certain metadata that may be different from metadata characterizing the rest (other segments) of the three-minute content instance. Any other lengths of the content instance or the segment may be used within the scope of this disclosure.

In some embodiments, further examples of structural elements may include certain metadata that may be treated as immutable for a given content instance (e.g., unique identifier, origin code, etc.), which may be used to reference a given content instance or segment thereof from a given data store or other programmatic means. e.g., via an application programming interface (API). Specific examples of APIs are described further below.

In some embodiments, parameter may include a tuple, vector, matrix, or at least one further parameter indicating a degree to which a first parameter is applied (e.g., numeric scale of luminous intensity, blurring, residual trailing, RGB values, audio frequencies, etc.). In some embodiments, parameter may include an indication of whether or not a given feature or filter is active (e.g., on or off).

In 506, processor 604 may be configured to associate the applicable parameter of the first template with the at least part of the first metadata corresponding to the at least one structural element. Such association may be done by any of the data structures described herein (e.g., key-value pair, table, relational database, etc., or other object in a computer memory or data storage device), in some embodiments. This association between metadata and parameters may thus serve to allow processor 604 to apply templates (e.g., templates' parameters) to any of multiple content instances independently of the structure or any specific structural elements of a given content instance.

In 508, processor 604 may be configured to transform, by a rendering engine running on processor 604, the first content instance. This transforming may include processor 604 configuring the at least one structural element of the first content instance to be played back according to the applicable parameter (e.g., of an applied template).

Rendering engine may run on processor 604 at a server of a service provider or content-distribution network (CDN), in some embodiments. Additionally, or alternatively, rendering engine may run on processor 604 at a client or end-user device (e.g., consumer handheld terminal device such as smartphone, tablet, or phablet; wearable device such as a smart watch or smart visor; laptop or desktop computer; set-top box or similar streaming device; etc.). Client-side transforming, e.g., content playback and/or rendering of applied templates or parameters, is described in further detail with respect to 408 above.

Server-side or client-side transforming may include statically or dynamically encoding, recoding, transcoding, and/or decoding audio, video, and/or text content via any of multiple audio/video codecs. The audio, video, and/or text content may be encoded, recoded, transcoded, or decoded before, during, or after any transforming in 508. In some embodiments, any of the encoding, recoding, transcoding, and/or decoding may be performed within the rendering engine running on processor 604.

In 510, processor 604 may be configured to playing, e.g., by a rendering engine running on processor 604, the first content instance, as transformed, via at least one content-playback device. A content-playback device may be a handheld terminal, wearable device, general-purpose computing device, or dedicated set-top box or streaming device, in some embodiments. Additional examples are described further herein.

EXAMPLE COMPUTER SYSTEM

The following example computer system, or multiple instances thereof, may be used to implement methods 400 or 500 of FIGS. 4 and 5, systems as shown in FIGS. 1-3, or any component thereof, according to some embodiments.

Figure 6:
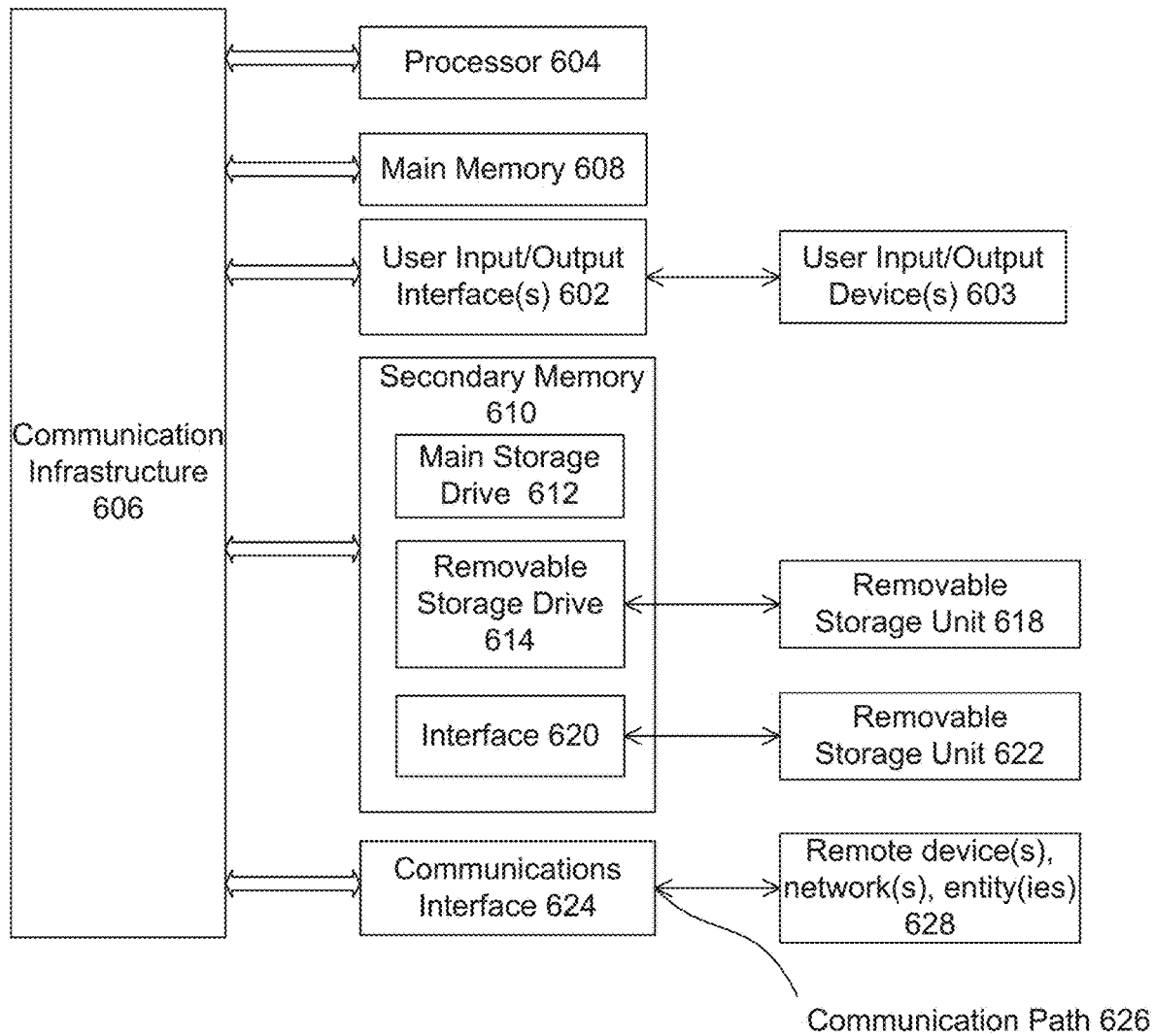
FIG. 6 is an example computer system useful for implementing various embodiments.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a bus or communication infrastructure 606.

Computer system 600 may also include user input/output device(s) 605, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, vector processing, array processing, etc., as well as cryptography, including brute-force cracking, generating cryptographic hashes or hash sequences, solving partial hash-inversion problems, and/or producing results of other proof-of-work computations for some blockchain-based applications, for example.

Additionally, one or more of processors 604 may include a coprocessor or other implementation of logic for accelerating cryptographic calculations or other specialized mathematical functions, including hardware-accelerated cryptographic coprocessors. Such accelerated processors may further include instruction set(s) for acceleration using coprocessors and/or other logic to facilitate such acceleration.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or secondary memory 610. Secondary memory 610 may include, for example, a main storage drive 612 and/or a removable storage device or drive 614. Main storage drive 612 may be a hard disk drive or solid-state drive, for example. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communication path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, nethook, tablet, smart phone, smart watch or other wearable, appliance, part of the Internet of Things (IoT), and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software (e.g., "on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), database as a service (DBaaS), etc.); and/or a hybrid model including any combination of the foregoing examples or other services or delivery paradigms.

Any applicable data structures, file formats, and schemas may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

Any pertinent data, files, and/or databases may be stored, retrieved, accessed, and/or transmitted in human-readable formats such as numeric, textual, graphic, or multimedia formats, further including various types of markup language, among other possible formats. Alternatively or in combination with the above formats, the data, tiles, and/or databases may be stored, retrieved, accessed, and/or transmitted in binary, encoded, compressed, and/or encrypted formats, or any other machine-readable formats.

Interfacing or interconnection among various systems and layers may employ any number of mechanisms, such as any number of protocols, programmatic frameworks, floorplans, or application programming interfaces (API), including but not limited to Document Object Model (DOM), Discovery Service (DS), NSUserDefaults, Web Services Description Language (WSDL), Message Exchange Pattern (MEP), Web Distributed Data Exchange (WDDX), Web Hypertext Application Technology Working Group (WHATWG) HTML5 Web Messaging, Representational State Transfer (REST or RESTful web services), Extensible User Interface Protocol (XUP), Simple Object Access Protocol (SOAP), XML Schema Definition (XSD), XML Remote Procedure Call (XML-RPC), or any other mechanisms, open or proprietary, that may achieve similar functionality and results.

Such interfacing or interconnection may also make use of uniform resource identifiers (URI), which may further include uniform resource locators (URL) or uniform resource names (URN). Other forms of uniform and/or unique identifiers, locators, or names may be used, either exclusively or in combination with forms such as those set forth above.

Any of the above protocols or APIs may interface with or be implemented in any programming language, procedural, functional, or object-oriented, and may be compiled or interpreted. Non-limiting examples include C, C++, C#, Objective-C, Java, Swift, Go, Ruby, Perl, Python, JavaScript, WebAssembly, or virtually any other language, with any other libraries or schemas, in any kind of framework, runtime environment, virtual machine, interpreter, stack, engine, or similar mechanism, including but not limited to Node.js, V8, Knockout, jQuery, Dojo, Dijit, OpenUI5, AngularJS, Express.js, Backbone.js, Ember.js, DHTMLX, Vue, React, Electron, and so on, among many other non-limiting examples.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing, Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments may operate with software, hardware, and/or operating system implementations other than those described herein.

CONCLUSION

It is to be appreciated that the Detailed Description section, and not any other section, is intended to be used to interpret the claims. Other sections may set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof The boundaries of these functional building blocks have been arbitrarily defined herein for the convenience of the description. Alternate boundaries may be defined as long as the specified functions and relationships (or equivalents thereof) are appropriately performed. Also, alternative embodiments may perform functional blocks, steps, operations, methods, etc. using orderings different from those described herein.

References herein to "one embodiment," "an embodiment," "an example embodiment," "some embodiments," or similar phrases, indicate that the embodiment described may include a particular feature, structure, or characteristic, but every embodiment may not necessarily include the particular feature, structure, or characteristic. Moreover, such phrases are not necessarily referring to the same embodiment.

Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments may be described using the expression "coupled" and "connected" along with their derivatives.

These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
retrieving, by at least one computer processor, a first content instance and corresponding first metadata, wherein the first content instance comprises a first plurality of structural elements, and wherein at least one structural element of the first plurality of structural elements corresponds to at least part of the first metadata;
transforming, by a rendering engine running on the at least one computer processor, the first content instance, wherein the transforming comprises configuring the at least one structural element of the first content instance to be played back according to at least an applicable parameter of a first template and the first metadata; and
transmitting, by the at least one computer processor, the first content instance, as transformed, to a content-playback device.

2. The computer-implemented method of claim 1, further comprising:
retrieving, by the at least one computer processor, a second content instance and corresponding second metadata, wherein the first content instance further comprises a second plurality of structural elements, and wherein at least one structural element of the second plurality of structural elements corresponds to at least part of the second metadata; and
transforming, by the rendering engine running on the at least one computer processor, the second content instance, wherein the transforming comprises configuring the at least one structural element of the second content instance to be played back according to the applicable parameter of the first template.

3. The computer-implemented method of claim 2, further comprising:
applying, by the at least one computer processor, a logic-based filter, a machine-learning process, or a combination thereof, to select a segment of the first content instance or of the second content instance, as at least part of the at least one structural element.

4. The computer-implemented method of claim 3, wherein the logic-based filter, the machine-learning process, or the combination thereof, comprise at least one key performance indicator (KPI)-style input configured to measure user engagement.

5. The computer-implemented method of claim 2, further comprising receiving, by the at least one computer processor, a recording created by an end user, wherein the recording corresponds to at least one of the first content instance or the second content instance.

6. The computer-implemented method of claim 1, further comprising:
selecting, by the at least one computer processor, a second template comprising a set of parameters, wherein a given parameter of the set of parameters is applicable to the at least one structural element of the first plurality of structural elements; and
transforming, by the rendering engine running on the at least one computer processor, the first content instance, wherein the transforming comprises configuring the at least one structural element of the first content instance to be played back according to the given parameter of the second template.

7. The computer-implemented method of claim 1, wherein the first template has been generated via an end user.

8. A non-transitory computer-readable storage medium comprising instructions stored thereon that, when executed by at least one computer processor, cause the at least one computer processor to perform operations comprising:
retrieving a first content instance and corresponding first metadata, wherein the first content instance comprises a first plurality of structural elements, and wherein at least one structural element of the first plurality of structural elements corresponds to at least part of the first metadata;
transforming, by a rendering engine running on the at least one computer processor, the first content instance, wherein the transforming comprises configuring the at least one structural element of the first content instance to be played back according to at least an applicable parameter of a first template and the first metadata; and
transmitting the first content instance, as transformed, to a content-playback device.

9. The non-transitory computer-readable storage medium of claim 8, the operations further comprising:
retrieving a second content instance and corresponding second metadata, wherein the first content instance further comprises a second plurality of structural elements, and wherein at least one structural element of the second plurality of structural elements corresponds to at least part of the second metadata; and
transforming, by the rendering engine running on the at least one computer processor, the second content instance, wherein the transforming comprises configuring the at least one structural element of the second content instance to be played back according to the applicable parameter of the first template.

10. The non-transitory computer-readable storage medium of claim 9, the operations further comprising:
applying, by the at least one computer processor, a logic-based filter, a machine-learning process, or a combination thereof, to select a segment of the first content instance or of the second content instance, as at least part of the at least one structural element.

11. The non-transitory computer-readable storage medium of claim 10, wherein the logic-based filter, the machine-learning process, or the combination thereof, comprise at least one key performance indicator (KPI)-style input configured to measure user engagement.

12. The non-transitory computer-readable storage medium of claim 9, the operations further comprising receiving, by the at least one computer processor, a recording created by an end user, wherein the recording corresponds to at least one of the first content instance or the second content instance.

13. The non-transitory computer-readable storage medium of claim 8, the operations further comprising:
selecting a second template comprising a set of parameters, wherein a given parameter of the set of parameters is applicable to the at least one structural element of the first plurality of structural elements; and transforming, by the rendering engine running on the at least one computer processor, the first content instance, wherein the transforming comprises configuring the at least one structural element of the first content instance to be played back according to the given parameter of the second template, and wherein the first template or the second template has been generated via an end user.

14. The non-transitory computer-readable storage medium of claim 8, wherein the first template has been generated via an end user.

15. A system comprising, comprising memory and at least one computer processor configured to perform operations comprising:

retrieving a first content instance and corresponding first metadata, wherein the first content instance comprises a first plurality of structural elements, and wherein at least one structural element of the first plurality of structural elements corresponds to at least part of the first metadata;

transforming, by a rendering engine running on the at least one computer processor, the first content instance, wherein the transforming comprises configuring the at least one structural element of the first content instance to be played back according to at least an applicable parameter of a first template and the first metadata; and transmitting the first content instance, as transformed, to a content-playback device.

16. The system of claim 15, the operations further comprising:

retrieving a second content instance and corresponding second metadata, wherein the first content instance further comprises a second plurality of structural elements, and wherein at least one structural element of the second plurality of structural elements corresponds to at least part of the second metadata; and transforming, by the rendering engine running on the at least one computer processor, the second content instance, wherein the transforming comprises configuring the at least one structural element of the second content instance to be played back according to the applicable parameter of the first template.

17. The system of claim 16, the operations further comprising:

applying, by the at least one computer processor, a logic-based filter, a machine-learning process, or a combination thereof, to select a segment of the first content instance or of the second content instance, as at least part of the at least one structural element.

18. The system of claim 17, wherein the logic-based filter, the machine-learning process, or the combination thereof, comprise at least one key performance indicator (KPI)-style input configured to measure user engagement.

19. The system of claim 16, the operations further comprising receiving, by the at least one computer processor, a recording created by an end user, wherein the recording corresponds to at least one of the first content instance or the second content instance.

20. The system of claim 15, the operations further comprising:

selecting a second template comprising a set of parameters, wherein a given parameter of the set of parameters is applicable to the at least one structural element of the first plurality of structural elements; and transforming, by the rendering engine running on the at least one computer processor, the first content instance, wherein the transforming comprises configuring the at least one structural element of the first content instance to be played back according to the given parameter of the second template.

21. The system of claim 15, wherein the first template has been generated via an end user.

\* \* \* \* \*